United States Patent
Choi et al.

(10) Patent No.: US 7,603,622 B2
(45) Date of Patent: Oct. 13, 2009

(54) METHOD FOR PROVIDING A USER INTERFACE CONFIGURED USING THREE FRAMES IN A DLNA SYSTEM

(75) Inventors: Woo-Jun Choi, Suwon-si (KR);
Ho-Chul Shin, Seongnam-si (KR);
Young-Kyu Bae, Suwon-si (KR);
Seung-Mi Kang, Yongin-si (KR);
Chul-seung Kim, Seoul (KR);
Young-Seop Han, Suwon-si (KR);
Joon-Oo Kim, Suwon-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 253 days.

(21) Appl. No.: 11/523,511

(22) Filed: Sep. 19, 2006

(65) Prior Publication Data

US 2007/0143687 A1 Jun. 21, 2007

(30) Foreign Application Priority Data

Dec. 5, 2005 (KR) .............. 10-2005-0117727

(51) Int. Cl.
*G06F 3/00* (2006.01)
(52) U.S. Cl. .............. 715/716; 715/718; 715/719; 715/734; 715/735; 715/737; 715/738; 715/781
(58) Field of Classification Search ......... 715/716–719, 715/734–735, 737–738, 781, 853; 725/86, 725/112
See application file for complete search history.

(56) References Cited

U.S. PATENT DOCUMENTS

| 5,793,366 | A | * | 8/1998 | Mano et al. ............. 715/839 |
| 2004/0031058 | A1 | * | 2/2004 | Reisman ................ 725/112 |
| 2004/0175098 | A1 | * | 9/2004 | Calhoon et al. ............ 386/46 |
| 2005/0198336 | A1 | * | 9/2005 | Eytchison et al. ......... 709/230 |
| 2006/0085351 | A1 | * | 4/2006 | Hug ..................... 705/59 |
| 2006/0156236 | A1 | * | 7/2006 | Heller et al. ............ 715/716 |
| 2006/0179079 | A1 | * | 8/2006 | Kolehmainen .......... 707/104.1 |
| 2006/0258289 | A1 | * | 11/2006 | Dua .................... 455/41.3 |
| 2006/0265427 | A1 | * | 11/2006 | Cohen et al. ............ 707/200 |

FOREIGN PATENT DOCUMENTS

WO     WO 2005/106878     11/2005

* cited by examiner

*Primary Examiner*—Weilun Lo
*Assistant Examiner*—Rashedul Hassan
(74) *Attorney, Agent, or Firm*—Cha & Reiter, LLC (57) ABSTRACT

A method for providing a user interface configured using three frames for a Digital Media Player (DMP) in a Digital Living Network Alliance (DLNA) system. Each of all source, renderer, and menu items of the DLNA system is set to one axis of a set of axes. Two predetermined axes of the set of axes and a contents list are selected according to selection by a DMP user of an operation to be performed within the DLNA system. A user interface of the DMP is configured using two frames for displaying the two predetermined axes and one frame for displaying the contents list.

12 Claims, 8 Drawing Sheets

METHOD FOR PROVIDING A USER INTERFACE CONFIGURED USING THREE FRAMES IN A DLNA SYSTEM

CLAIM OF PRIORITY

This application claims priority under 35 U.S.C. §119 to an application entitled "Method for Providing a User Interface Configured Using Three Frames in a DLNA System," filed in the Korean Intellectual Property Office on Dec. 5, 2005 and assigned Serial No. 2005-117727, the contents of which are incorporated herein by reference.

BACKGROUND OF THE INVENTION

1. Field of the Invention

The present invention generally relates to a Digital Living Network Alliance (DLNA) system, and more particularly to an apparatus and method for effectively receiving a contents list according to source and renderer positions in a DLNA system.

2. Description of the Related Art

Home network technology provides a future-oriented home environment in which anyone can receive various high-quality home services when all information appliances in the home are connected to a wired/wireless network, irrespective of place and time. Because this home network technology is regarded as the underlying enabling technology of an ubiquitous environment and is the key technology, research is on-going into ways to improve performance while maintaining quality and scope of services.

One organization whose objectives include improving home network technology is the Digital Living Network Alliance (DLNA), a standardization organization for home network technology. The DLNA solves compatibility problems encountered in commercializing home network products by serving as a standardization organization. The DLNA was created as a result of efforts of an existing Digital Home Working Group (DHWG) created by Microsoft, IBM, HP, Intel, Sony, Matsushita, Samsung Electronics, and others on June 2003.

The DLNA defines a Personal Computer (PC) Internet network (of a PC, printer, etc.), a mobile network (of a Personal Digital Assistant (PDA), mobile phone, notebook computer, etc.), and an appliance network (of a Television (TV), audio, Digital Video Disc (DVD) player, etc.) as networks coexisting in the home. Moreover, the DLNA has attempted to provide interoperability through three schemes based on cooperation between leading industrial companies, standardization of an interoperability framework, products conforming thereto, and so on.

Specifically, the technology considered by the DLNA is to obtain, transmit, and manage a plurality of digital media contents (e.g., images, music, video, etc.) from personal devices such as mobile devices, PCs, etc. for consumers. That is, the DLNA technology allows media contents to be conveniently enjoyed on a home device, irrespective of the position and the type of device in the home.

For this, the DLNA is developing standards for physical media, network transmission, media formats, streaming protocols, Digital Right Management (DRM), among others on the basis of Universal Plug and Play (UPnP) technology.

Next, the DLNA will be described in detail. First, a network connection in the DLNA is based on Internet Protocol (IP). The IP is the basic network communication protocol for a device operating on the Internet. Through the IP, information can be transparently exchanged by instances of an application program executing on various media.

For example, a PC or Set-Top Box (STB) can wirelessly transmit media contents to a TV of the home through an Institute of Electrical and Electronics Engineers (IEEE) 802.11 Access Point (AP) connected to an Ethernet cable. Accordingly, all DLNA devices can communicate with other devices connected to the Internet through the IP, anywhere in the world.

A physical layer of the DLNA uses at least one of a wired high-speed Ethernet (802.11u) and a wireless Ethernet (802.11a/b/g). The stability of the wired Ethernet has been already verified. The wireless Ethernet has adopted Wi-Fi to accommodate the increase of wireless home network communication.

The technology for discovering and controlling a device within a DLNA network is based on the existing UPnP Audio Video (AV) architecture and the existing UPnP device architecture to automatically configure a networking setup for an IP address and identify and manage other devices. Similarly, the technology for discovering and controlling a service within a DLNA network is also based on the existing UPnP AV architecture and the existing UPnP device architecture In the above-described DLNA, device classes are divided into a Digital Media Server (DMS) and a Digital Media Player (DMP). The DMS performs a function of a Media Server Device (MSD), i.e., a function of a server for providing media in the UPnP AV spec, and the DMP performs functions of a Media Renderer Device (MRD) and a Media Renderer Control Point (MRCP), i.e., functions for selecting, controlling, and playing media.

Figure 1:
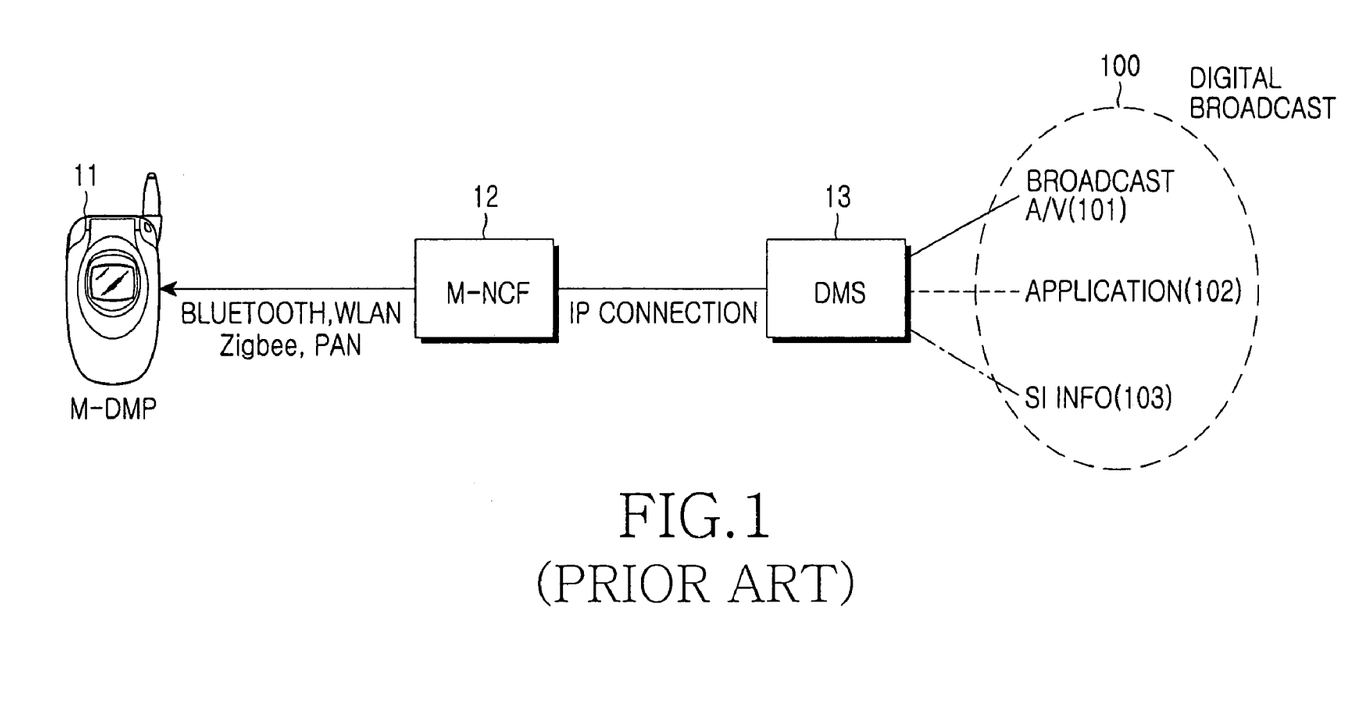
FIG. 1 illustrates an example of a conventional Digital Living Network Alliance (DLNA) system modified according to the present invention.

FIG. 1 illustrates an example of a conventional DLNA system to which the present invention is applied. As illustrated in FIG. 1, the DLNA system comprises a DMS 13 for providing multimedia contents and a Mobile DMP (M-DMP) 11 for executing the provided multimedia contents. The M-DMP 11 conventionally includes wired and wireless DMPs. The M-DMP 11 is preferably wireless, but the present invention includes a wired DMP. A Mobile-Network Connection Function (M-NCF) 12 is used as an intermediate node for connecting the M-DMP 11 and the DMS 13.

Currently, a communication protocol for a connection between the M-DMP 11 and the M-NCF 12 uses both Bluetooth and Wireless Local Area Network (WLAN). According to the technology development of a wireless network, there can be used Zigbee and a Personal Area Network (PAN) corresponding to a local-area personal communication network defined on the basis of a personal life style. In comparison with Bluetooth, Zigbee is the typical wireless sensor network technology with lower power, lower cost, and more ease of use. Zigbee has a high-level protocol and application based on a PHY/MAC layer standardized in the IEEE 802.15.4-2003 standard.

Figure 2A:
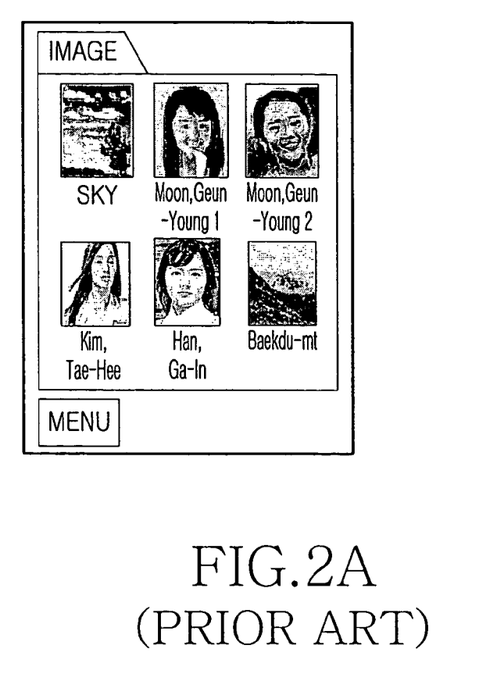
FIGS. 2A and 2B illustrate an example of a user interface in a conventional DLNA system.
Figure 2B:
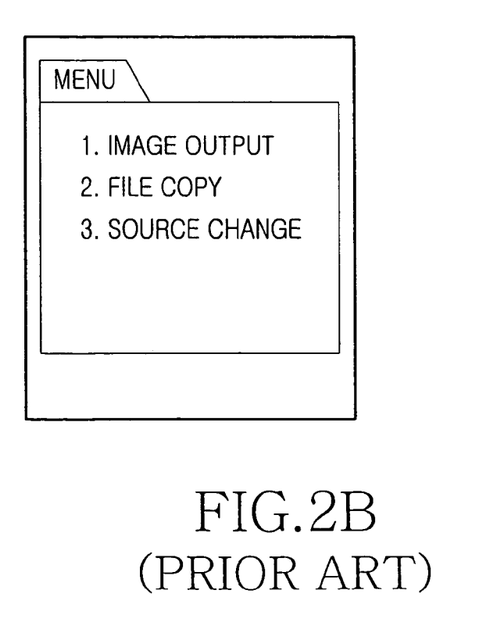

FIGS. 2A and 2B illustrate an example of a user interface in the conventional DLNA system. As illustrated in FIG. 2A, a DMP displays all associated contents within the DLNA system in the thumbnail format in order to output some contents within the DLNA system. In a menu configuration as illustrated in FIG. 2B, a selection is made of at least one of a content selected from the group consisting of a device to output multimedia contents selected through a sub-menu, a device to receive copied contents, a device to transmit an image, etc.

When the conventional user interface is used, the DMP performs many steps in order to execute a desired function.

For example, the DMP can select a home network device (e.g., a TV, STB, audio, digital camera, PC, etc.) in which particular contents are present, select desired contents from various types of contents files (e.g., mpg, jpg, and mp3), select another home network device for realizing a desired function (e.g., play, copy, etc.) for the selected contents, and execute the desired function.

In this case, the DLNA system must perform many steps to accomplish a multimedia output task desired by a user (because many pages must be turned and cannot be easily displayed on one screen according to existing User Interface (UI) configurations). For this reason, the user is significantly inconvenienced.

When particular contents are selected by a user, selection of the desired contents is time-consuming because a PC supports various content types as well as supports a plurality of contents. Furthermore, the user does not always know information about which device can support a certain content type.

The user must perform many steps in order to determine which device can support a desired function (e.g., play, view, copy, etc.). Because existing UIs are implemented with many pages, the user is inconvenienced.

SUMMARY OF THE INVENTION

Accordingly, the present invention solves the above and other problems by providing an apparatus and method for a user interface configured using three frames that allow a user of a Digital Media Player (DMP) to easily retrieve desired contents and output the retrieved contents using a desired device in a Digital Living Network Alliance (DLNA) system.

In accordance with an aspect of the present invention, there is provided a method for providing a user interface configured using three frames for a Digital Media Player (DMP) in a Digital Living Network Alliance (DLNA) system, comprising the steps of:

a) setting each of all source, all renderer, and all menu items of the DLNA system to one axis of a set of axes;

b) selecting two predetermined axes of the set of axes and a contents list in accordance with a selection by a DMP user of an operation to be performed within the DLNA; and c) configuring and displaying a user interface of the DMP with two frames for the two predetermined axes and one frame for displaying the contents list according to the selection in step b).

BRIEF DESCRIPTION OF THE DRAWINGS

The above and other aspects of the present invention will be more clearly understood from the following detailed description taken in conjunction with the accompanying drawings, in which.

DETAILED DESCRIPTION OF THE INVENTION

Exemplary embodiments of the present invention will be described in detail herein below with reference to the accompanying drawings. For the purposes of clarity and simplicity, detailed descriptions of functions and configurations incorporated herein that are well known to those skilled in the art are omitted for clarity and conciseness.

FIG. 1 illustrates an example of a conventional DLNA system to which the present invention is applied. As illustrated in FIG. 1, the DLNA system is configured on the basis of a DMS 13 for providing multimedia contents and a Mobile DMP (M-DMP) 11 for executing the provided multimedia contents. The M-DMP 11 conventionally includes wired and wireless DMPs. The M-DMP 11 of a preferred embodiment is wireless while an alternative embodiment is wired. A Mobile-Network Connection Function (M-NCF) entity 12 is used as an intermediate node for connecting the M-DMP 11 and the DMS 13. Herein, the DMS 13 preferably includes broadcast middleware and a broadcast receiver for receiving a digital broadcast.

Currently, a communication protocol for a connection between the M-DMP 11 and the M-NCF entity 12 uses Bluetooth and Wireless Local Area Network (WLAN). However, in a preferred embodiment of the present invention, Zigbee and a Personal Area Network (PAN) (corresponding to a local-area personal communication network defined on the basis of a personal life style) are also used. In comparison with Bluetooth, Zigbee is the typical wireless sensor network technology with lower power consumption, lower cost, and greater ease of use. Zigbee has a high-level protocol and application based on a PHY/MAC layer standardized in the IEEE 802.15.4-2003 standard.

Herein, the DMS stores contents, and the M-DMP 11 is a Digital Media Renderer (DMR) with a UPnP Control Point (CP). In a preferred embodiment of the present invention, the DLNA system is based on the UPnP.

First, it is assumed that the user desires to view video stored in a DMS (e.g., a camcorder) 11 through a PC by means of the M-DMP 11.

In this case, a user interface of the M-DMP 11 performs an operation for browsing DMSs 13 within the DLNA system through a browse event.

Through this browsing operation, the DMSs 13 on the UPnP send browsed contents to the M-DMP 11 through an event. An "EventListener" present within the CP of the M-DMP 11 receives associated events.

When the associated event is a Content Directory Service (CDS) event, contents possessed by the DMS 13 are stored in a Database (DB) through a "ContainerManager( )". As a result, an item list is provided to the user through the user interface.

Information about a contents format supportable by each renderer device is detected through a "GetProtocolInfo( )"

contained within the CDS event. Through a "GetProtocolInfo( )", a contents file type supportable by each renderer device is detected.

Figure 3:
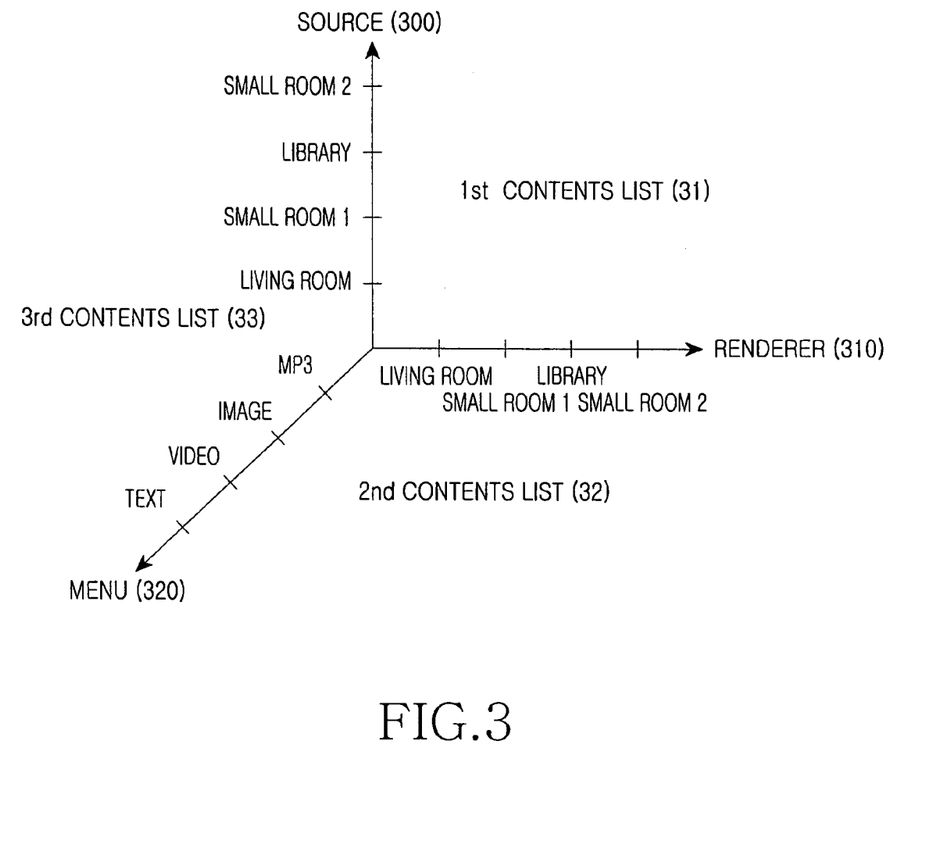
FIG. 3 illustrates an example of a frame configuration in for providing a user interface configured using three frames in a DLNA system in accordance with the present invention.

FIG. 3 illustrates an example of a frame configuration for providing a user interface configured using three frames in the DLNA system, in accordance with the present invention.

As illustrated in FIG. 3, providing the user interface configured using the three frames in the DLNA system in accordance with the present invention provides first, second, and third contents lists 31, 32, and 33 on the basis of a set of axes comprising a source axis 300, a renderer axis 310, and a menu axis 320.

As illustrated in FIG. 3, a user interface is provided for selecting source and renderer devices of the DLNA system on the basis of the respective axes, a user interface, configured in relation to a source and a menu, for enabling various processes relative to the source, and a user interface, configured in relation to a renderer and a menu, for additionally including the menu axis and enabling various processes relative to the renderer, for the frame configuration for providing the user interface configured using the three frames in the DLNA system in accordance with the present invention.

Referring to FIG. 3, the source axis 300 of the set of axes is used to display a device from which contents are obtained. That is, data memories of the DLNA system are set as contents of the source axis 300. For example, the contents are displayed as Living Room, Small Room 1, Small Room 2, Library, etc.

The renderer axis 310 of the set of axes is used to display a device for outputting contents. That is, display or audio devices of the DLNA system are set as contents of the renderer axis 310. For example, the contents are displayed as Living Room, Small Room 1, Small Room 2, Library, etc.

The menu axis 320 of the set of axes is used to display types of contents to be output. In an exemplary embodiment of the present invention, only types of contents are displayed. Those skilled in the art will appreciate that a configuration of the associated menu axis can be modified in various ways relative to Store, Edit, and Move functions etc.

The first contents list 31 displays a list of contents of a selected source device. The second contents list 32 displays a list of all contents relative to one type of Text, Video, Image, and MP3 selected through the menu. The third contents list 33 displays a list of contents of a particular source device relative to one type of Text, Video, Image, and MP3 selected through the menu.

Figure 4:
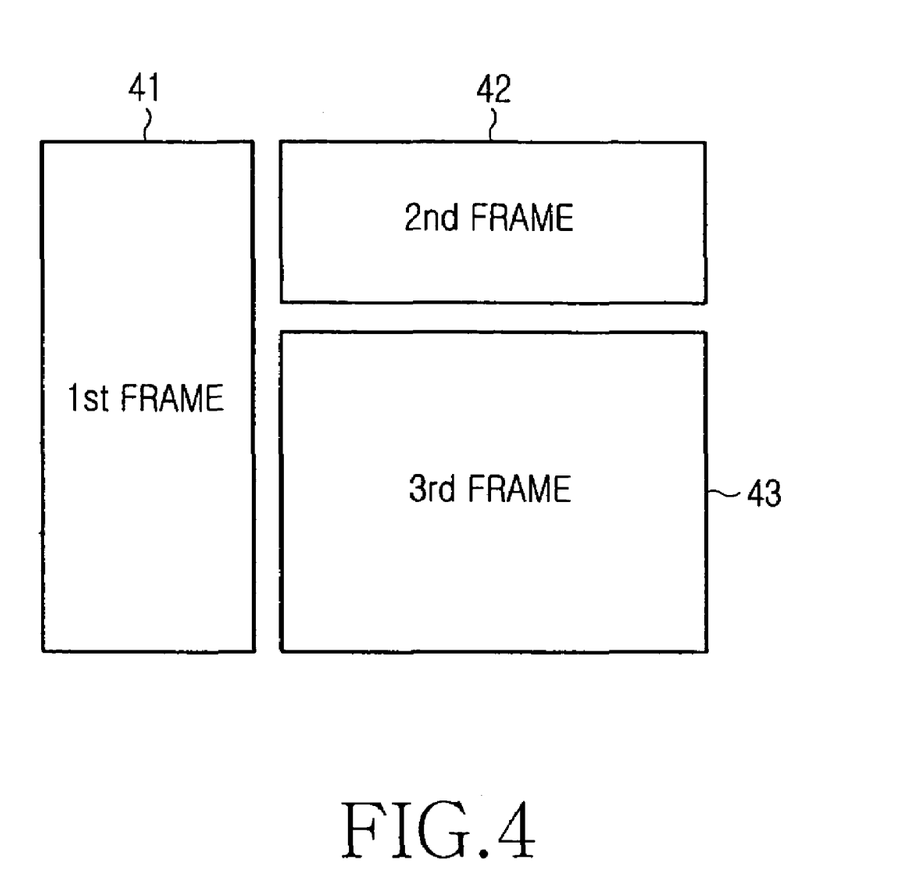
FIG. 4 illustrates an example of a frame structure in for providing the user interface configured using the three frames in the DLNA system in accordance with the present invention.

FIG. 4 illustrates an example of a frame structure for providing the user interface configured using the three frames in the DLNA system in accordance with the present invention.

As illustrated in FIG. 4, the frame structure for providing the user interface configured using the three frames in the DLNA system in accordance with the present invention has three frames. The three frames are the first frame 41 arranged in a vertical direction, the second frame 42 arranged in a horizontal direction, and the third frame 43 for displaying a contents list.

Herein, an example in which the first frame 41 is mapped to the menu axis 320 and the second frame 42 is mapped to the renderer axis 310 will be described with reference to FIG. 6. Of course, a relation between the axes and the frames mapped thereto can be different. The following example is only used for explanation of the present invention, but does not limit the scope of the present invention.

Figure 5:
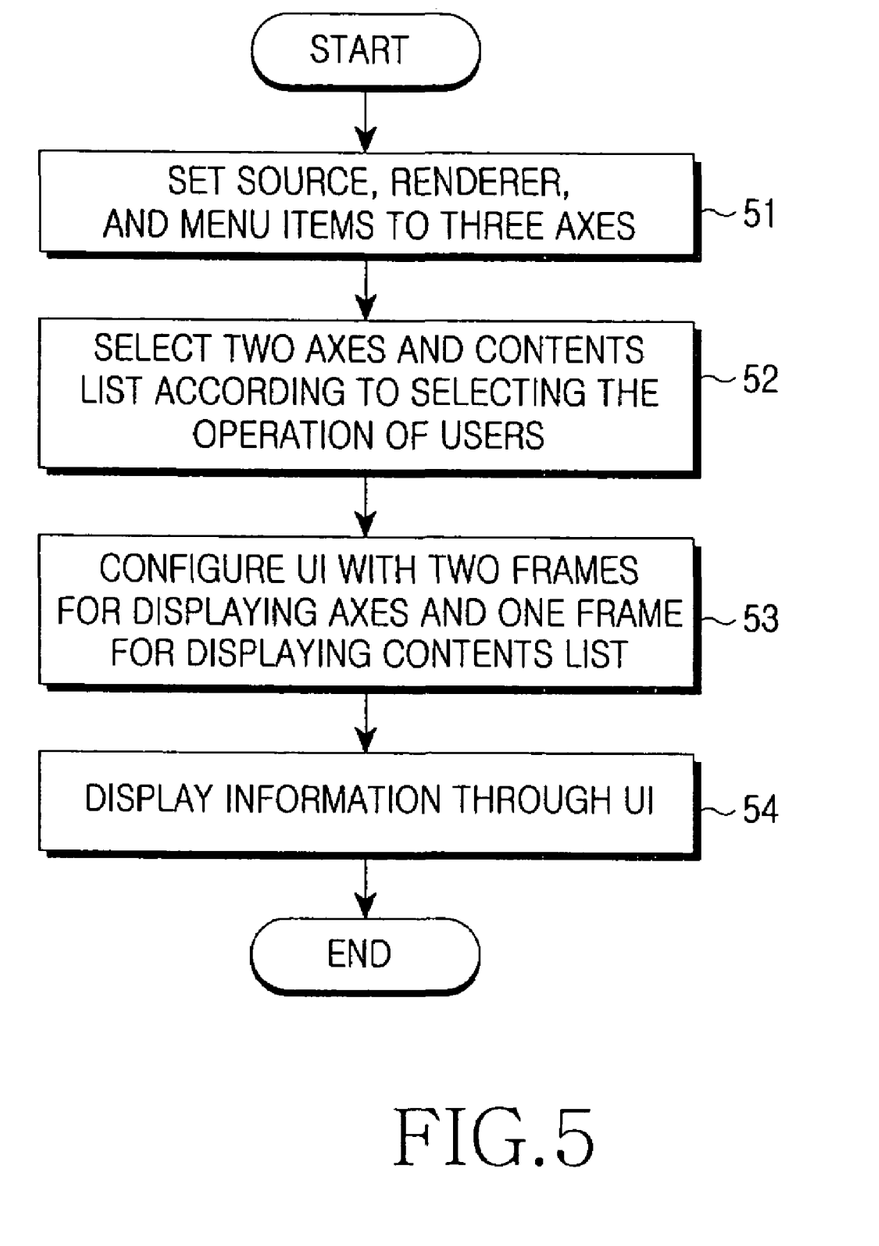
FIG. 5 is a flowchart illustrating an example of the method for providing the user interface configured using the three frames in the DLNA system in accordance with the present invention.

FIG. 5 is a flowchart illustrating an example of a method for providing the user interface configured using the three frames in the DLNA system in accordance with the present invention.

Referring to FIG. 5, all source, renderer, and menu items of the DLNA system are set to the respective axes in order to provide the user interface configured using the three frames (Step 51).

According to an operation selection of the user, two axes and a contents list are selected (Step 52). In the operation selection, the user can select various operations such as "MP3 Listen", "Video View", "File Copy", and so on. These operations are selected using the user interface in accordance with the present invention.

A configuration of the axes according to the operation selection is shown in Table 1.

TABLE 1

| DMP User Operation Selection | $1^{st}$ Frame (41) | $2^{nd}$ Frame (42) | $3^{rd}$ Frame (43) |
| --- | --- | --- | --- |
| MP3 Listen (Source By Source) | Source Axis | Renderer Axis | $1^{st}$ Contents list |
| MP3 Listen (Total) | Menu Axis | Renderer Axis | $2^{nd}$ Contents list |
| Video View (Source By Source) | Source Axis | Renderer Axis | $1^{st}$ Contents list |
| Video View (Total) | Menu Axis | Renderer Axis | $2^{nd}$ Contents list |
| Video Record | Renderer Axis | Source Axis | $1^{st}$ Contents list (Renderer) |
| File Copy | Source Axis | Source Axis | From $1^{st}$ Source To $2^{nd}$ Source |

When the two axes and the contents list are selected, the user interface of a terminal is configured using the two frames 41 and 42 for displaying the axes and the one frame 43 for displaying the contents list (Step 53).

Then, information is displayed through a configured user interface (Step 54).

Figure 6:
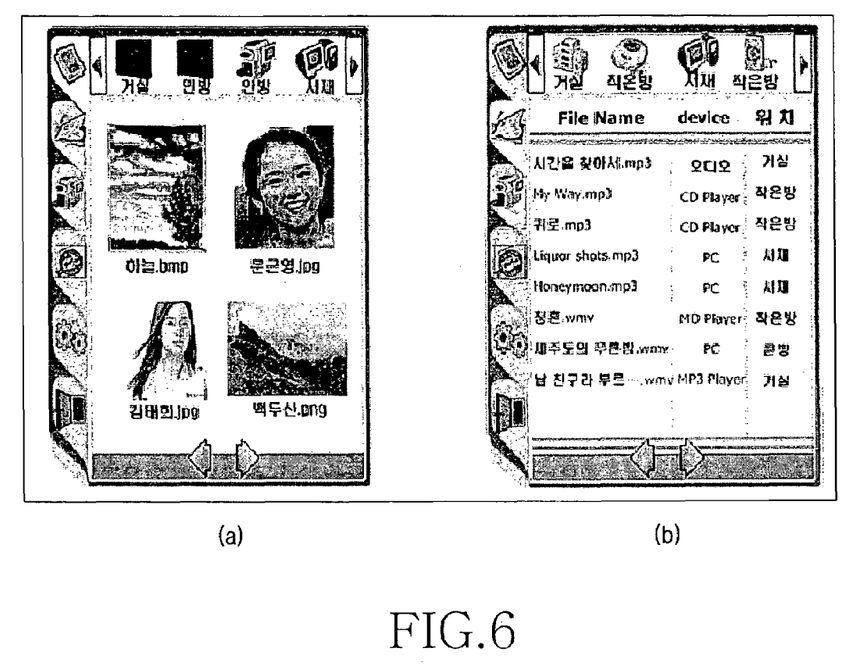
FIG. 6 illustrates a first example of the user interface for providing the user interface configured using the three frames in the DLNA system in accordance with the present invention.

FIG. 6 illustrates a first example of a user interface for providing the user interface configured using the three frames in the DLNA system in accordance with the present invention.

FIG. 6(a) illustrates an example of selecting an item of Image on the menu axis of the first frame 41. FIG. 6(b) illustrates an example of selecting an item of MP3 on the menu axis of the first frame 41. The second frame 42 displays renderer devices on the renderer axis, and the third frame 43 displays a contents list relative to the Image or MP3 item.

The first frame 41 has been configured using menus according to contents types in an example of FIG. 6. Like a search menu, a menu is configured such that a File Name search, a File Format search, and a Device search can be performed or configured. Like a setup menu, a menu can be configured such that a Rename setup function (of a device, contents format, etc.) can be performed.

The second frame 42 displays renderer devices (for performing play and copy functions).

The third frame 43 displays a contents list (e.g., a thumbnail list in the case of images) according to menu.

Figure 7:
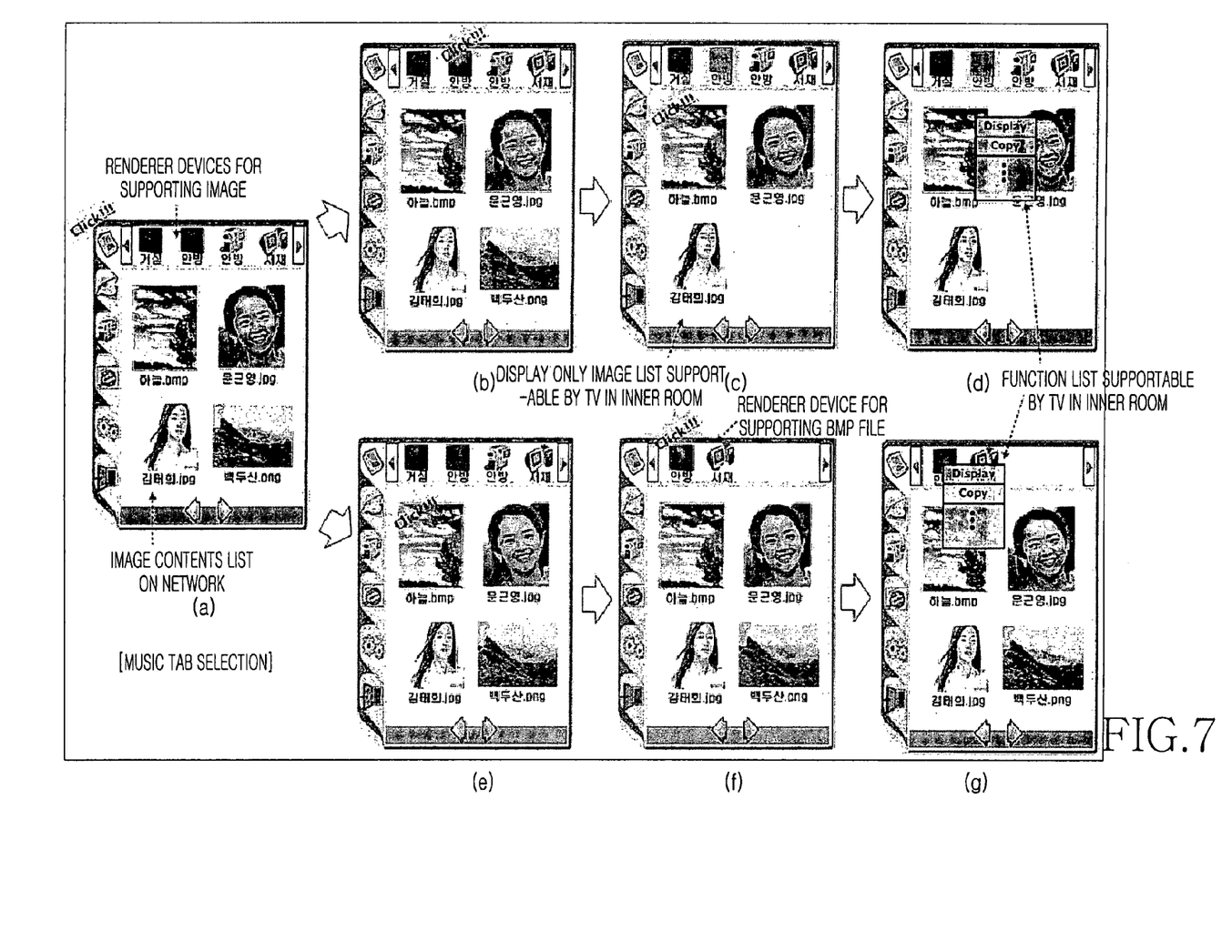
FIG. 7 illustrates a second example of the user interface for providing the user interface configured using the three frames in the DLNA system in accordance with the present invention.

FIG. 7 illustrates a second example of the user interface for providing the user interface configured using the three frames in the DLNA system in accordance with the present invention.

FIG. 7(a) illustrates an example of selecting an item of Image on the menu axis of the first frame 41. FIGS. 7(b) to 7(d) illustrate an example of selecting a display device of an inner room on the renderer axis of the second frame 42. When a device of the renderer axis is selected in FIG. 7(b), only a contents list based on a contents format supportable by an associated device of the renderer axis is displayed as illustrated FIG. 7(c). As illustrated in FIG. 7(d), a function can be selected and performed through menu selection on the user interface.

FIGS. 7(e) to 7(g) illustrate an example of selecting predetermined contents in a contents list of the third frame 43. When the predetermined contents are selected in FIG. 7(e), only a renderer device capable of supporting a format of the predetermined contents is displayed on the second frame 42 as illustrated in FIG. 7(f). As illustrated in FIG. 7(g), a function can be selected and performed through menu selection on the user interface.

Figure 8:
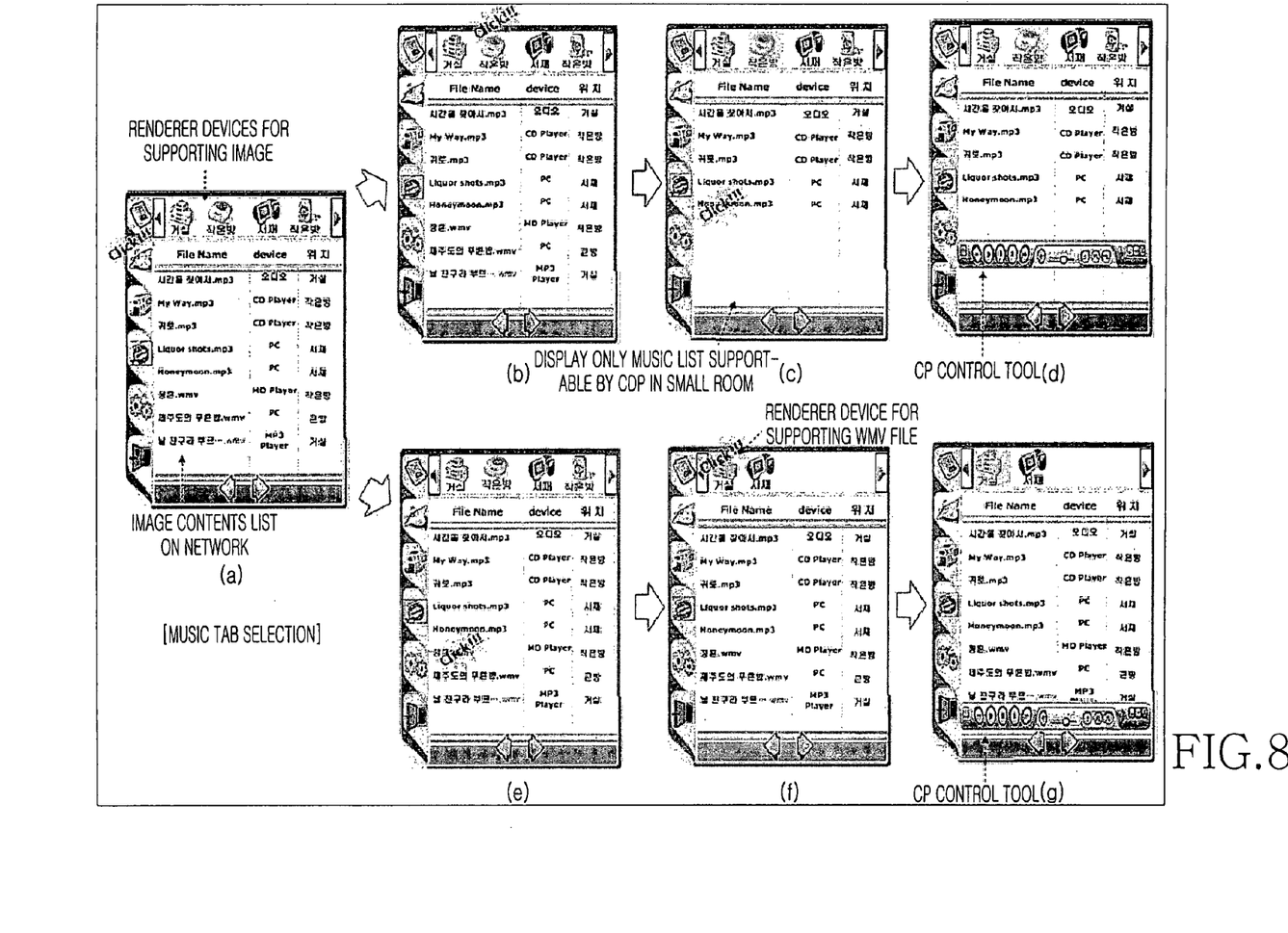
FIG. 8 illustrates a third example of the user interface for providing the user interface configured using the three frames in the DLNA system in accordance with the present invention.

FIG. 8 illustrates a third example of the user interface for providing the user interface configured using the three frames in the DLNA system in accordance with the present invention.

FIG. 8(a) illustrates an example of selecting an item of MP3 on the menu axis of the first frame 41. FIGS. 8(b) to 8(d) illustrate an example of selecting a display device of an inner room on the renderer axis of the second frame 42. When a device of the renderer axis is selected in FIG. 8(b), only a contents list based on a contents format supportable by an associated device of the renderer axis is displayed as illustrated FIG. 8(c). As illustrated in FIG. 8(d), a function can be selected and performed through menu selection on the user interface.

FIGS. 8(e) to 8(g) illustrate an example of selecting predetermined contents in a contents list of the third frame 43. When the predetermined contents are selected in FIG. 8(e), only a renderer device capable of supporting a format of the predetermined contents is displayed on the second frame 42 as illustrated in FIG. 8(f). As illustrated in FIG. 8(g), a function can be selected and performed through menu selection on the user interface.

The present invention for providing a user interface configured using three frames is not limited to the DLNA system in the example of the present invention. The present invention can be applied to all portable devices for supporting various multimedia outputs.

As described above, the present invention is implemented with a computer executable program and can be stored in a computer readable recoding medium such as a CD-ROM, RAM, floppy disk, hard disk, and optical magnetic disk.

As described above, the present invention provides a user interface having a 3-frame structure in the DLNA system, thereby easily performing a multi-step operation without making a page change.

Moreover, the present invention provides information about a renderer and a source to a user at one time and provides the intuitive convenience of an integrated user interface.

Although the exemplary embodiments and the accompanying drawings of the present invention have been disclosed for illustrative purposes, those skilled in the art will appreciate that various modifications, additions, and substitutions are possible, without departing from the scope of the present invention.

What is claimed is:

1. A method for configuring a user interface using three frames for a Digital Media Player (DMP) in a Digital Living Network Alliance (DLNA) system, comprising the steps of:
   a) setting each of all source, all renderer, and all menu items of the DLNA system to a separate axis of a set of three axes;
   b) selecting two predetermined axes of the set of three axes and a contents list according to a selection by a DMP user of an operation to be performed within the DLNA system; and
   c) configuring and displaying a user interface of the DMP using two frames for the display of the two predetermined axes and using one frame for the display of the contents list according to the selection of step b);
   wherein when one of the two predetermined axes is a renderer axis and predetermined contents of the contents list are selected, the configuring and displaying step further comprises the step of displaying within a frame for displaying the renderer axis only renderer devices capable of outputting a format for supporting the predetermined contents.

2. The method of claim 1, wherein when one of the two predetermined axes is a renderer axis and a renderer device displayed on the renderer axis is selected, the configuring and displaying step further comprises the step of only displaying contents of a format supportable by the renderer device among contents within the contents list.

3. The method of claim 1, further comprising the step of configuring a menu according to types of contents contained in the DLNA system.

4. The method of claim 1, further comprising the step of configuring a menu using a search menu comprising a file name search, a file format search, and a device search for contents contained in the DLNA system.

5. The method of claim 1, further comprising the step of configuring a menu using a setup menu comprising a rename setup function for contents contained in the DLNA system.

6. An apparatus for configuring a user interface of a Digital Media Player (DMP) of a Digital Living Network Alliance (DLNA) system, comprising:
   a computer readable recording medium;
   a set of three axes stored on said medium consisting of a source axis, a menu axis and a renderer axis wherein each axis has an associated contents list;
   a computer executable program stored on said medium to configure and display the DMP user interface using three frames in accordance with a user selection of an operation from a predetermined set of operations such that two predetermined axes of the set of axes and a contents list are respectively displayed in the three frames;
   wherein when one of the two predetermined axes is a renderer axis and predetermined contents of the contents list are selected, only renderer devices compatible with outputting a format for supporting the predetermined contents are displayed within a frame for displaying the renderer axis.

7. The apparatus of claim 6, wherein when one of the two predetermined axes is a renderer axis and a renderer device displayed on the renderer axis is selected, only contents of a format supportable by the renderer device are displayed among contents within the contents list.

8. The apparatus of claim 6, wherein a menu is configured according to types of contents contained in a Digital Living Network Alliance (DLNA) system that includes the apparatus.

9. The apparatus of claim 6, wherein a menu is configured using a search menu comprising a file name search, a file format search, and a device search for contents contained in a Digital Living Network Alliance (DLNA) system that includes the apparatus.

10. The apparatus of claim 6, wherein a menu is configured using a setup menu comprising a rename setup function for contents contained in a Digital Living Network Alliance (DLNA) system that includes the apparatus.

11. A computer readable medium storing a program configured to execute the method of claim 1.

12. The computer readable medium of claim 11, wherein the medium is selected from the group consisting of CD-ROM, RAM, floppy disk, hard disk, and optical magnetic disk.

* * * * *

UNITED STATES PATENT AND TRADEMARK OFFICE
CERTIFICATE OF CORRECTION

PATENT NO. : 7,603,622 B2  Page 1 of 1
APPLICATION NO. : 11/523511
DATED : October 13, 2009
INVENTOR(S) : Woo-Jun Choi et al.

It is certified that error appears in the above-identified patent and that said Letters Patent is hereby corrected as shown below:

On the Title Page
Item [75], fifth inventor's name, should read as follows:

--Chul-Seung Kim.--

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,603,622 B2  Page 1 of 1
APPLICATION NO. : 11/523511
DATED : October 13, 2009
INVENTOR(S) : Choi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 277 days.

Signed and Sealed this

Fifth Day of October, 2010

David J. Kappos
*Director of the United States Patent and Trademark Office*